Figure 1:
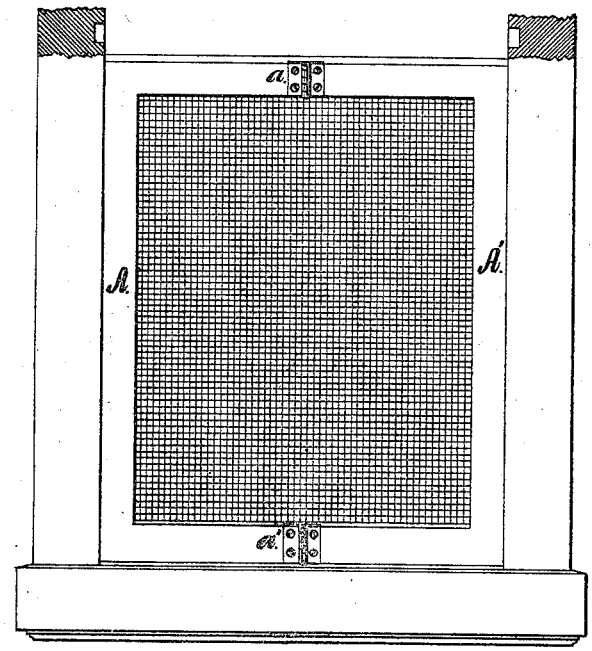

S. B. WHITFORD.
Window-Screens.

No. 134,409. Patented Dec. 31, 1872.

WITNESSES. INVENTOR.

UNITED STATES PATENT OFFICE.

SILAS B. WHITFORD, OF PROVIDENCE, RHODE ISLAND.

IMPROVEMENT IN WINDOW-SCREENS.

Specification forming part of Letters Patent No. 134,409, dated December 31, 1872.

*To all whom it may concern:*

Be it known that I, SILAS B. WHITFORD, of the city and county of Providence, in the State of Rhode Island, have made certain new and useful Improvements in Window-Screens; and I do hereby declare that the following specification, taken in connection with the drawing making a part of the same, is a full, clear, and exact description thereof.

Figure 2:
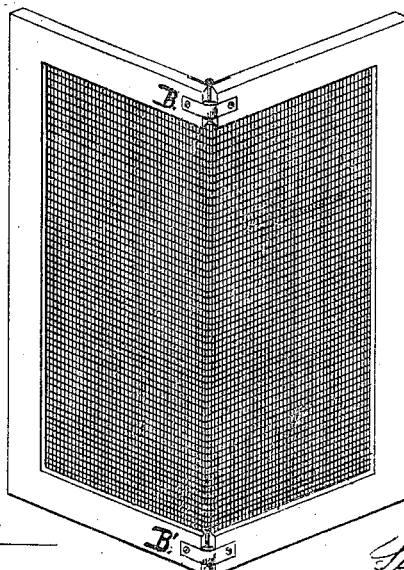

Figure 1 is a view of the screen in the window. Fig. 2 is a view showing the position of the same while being inserted in or removed from the window.

The object of my invention is to so construct a screen that it may be easily and quickly placed in or taken out of the window without removing the "window-sticks" which hold the sash in place, and consists in the improvements hereinafter described.

That class of screens which are removable at pleasure are constructed narrower than the sash, so that they may be placed in position without removing the "sticks," by first introducing one side and then the other. This leaves a space between the window-frame and the screen upon each side. If, however, the screen is so put in, or after being put in slips one way or the other so that all the space is upon one side, as is often the case, the flies will find sufficient room to gain an entrance. To overcome these difficulties I construct the frame of the screen in two parts, A and A′, the gauze being in one piece, as in the screens now in use. I connect the two parts of the frame A and A′ by hinges $a\ a'$ at the top and bottom on the one side, while upon the other side and opposite to the hinges I place springs B and B′. These springs may be made of any desirable material or shape. I prefer, however, a simple strip of rubber, as shown in Fig. 2.

The operation of my invention is as follows: When it is desired to put in the screen it may be taken hold of in any convenient way so that the resistance of the springs may be easily overcome and the two parts made to assume the position relative to each other, as shown in Fig. 2, when the screen may be placed in the window, and upon the removal of the hands will be brought by the springs to its original position, as shown in Fig. 1, thus filling the entire space.

What I claim as my invention, and desire to secure by Letters Patent, is—

A window-screen having its frame made in two parts, joined together with a combined hinge and spring, the whole constructed and operating in the manner substantially as described.

SILAS B. WHITFORD.

Witnesses:
 WALTER B. VINCENT,
 JAMES H. PARSONS.